UNITED STATES PATENT OFFICE.

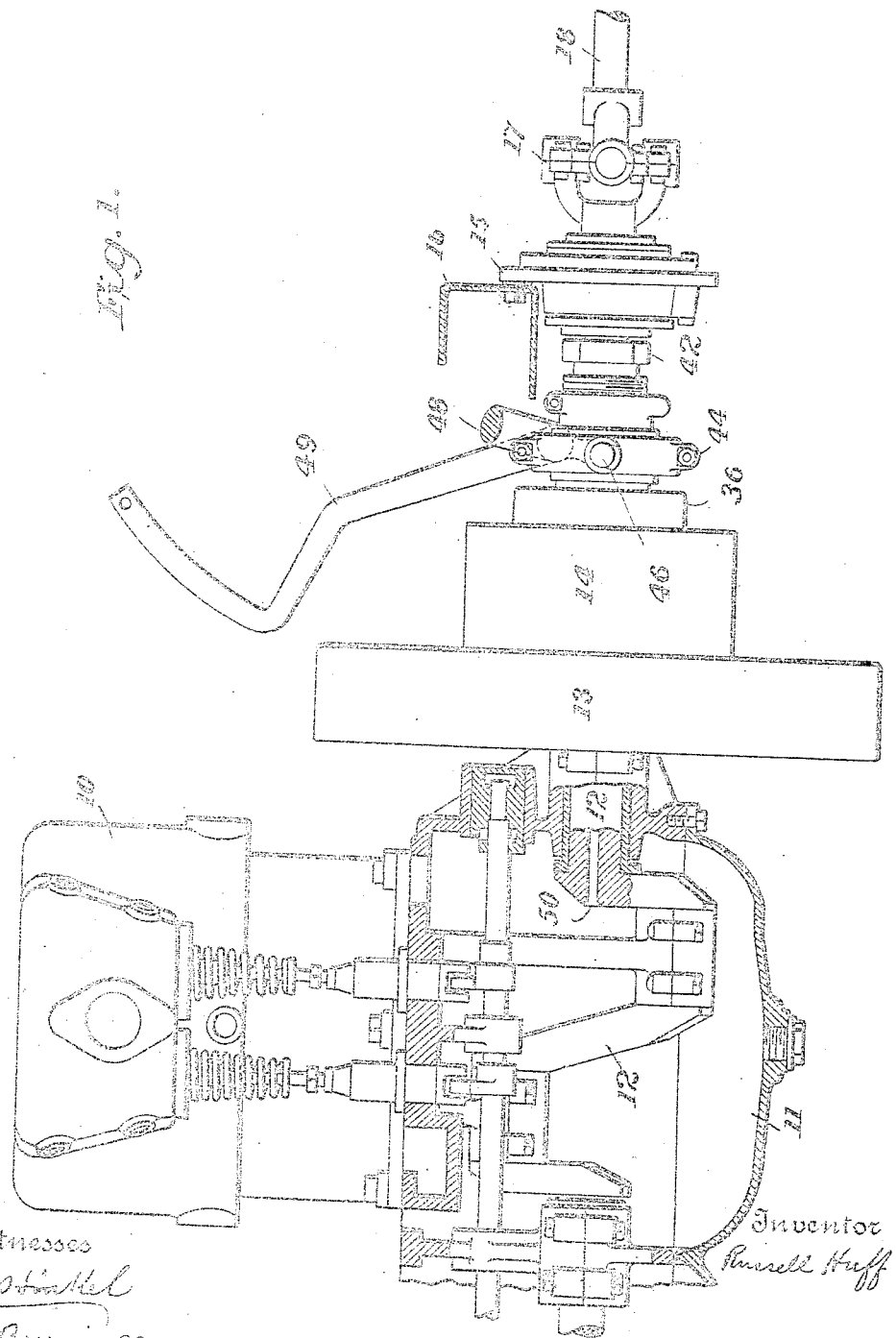

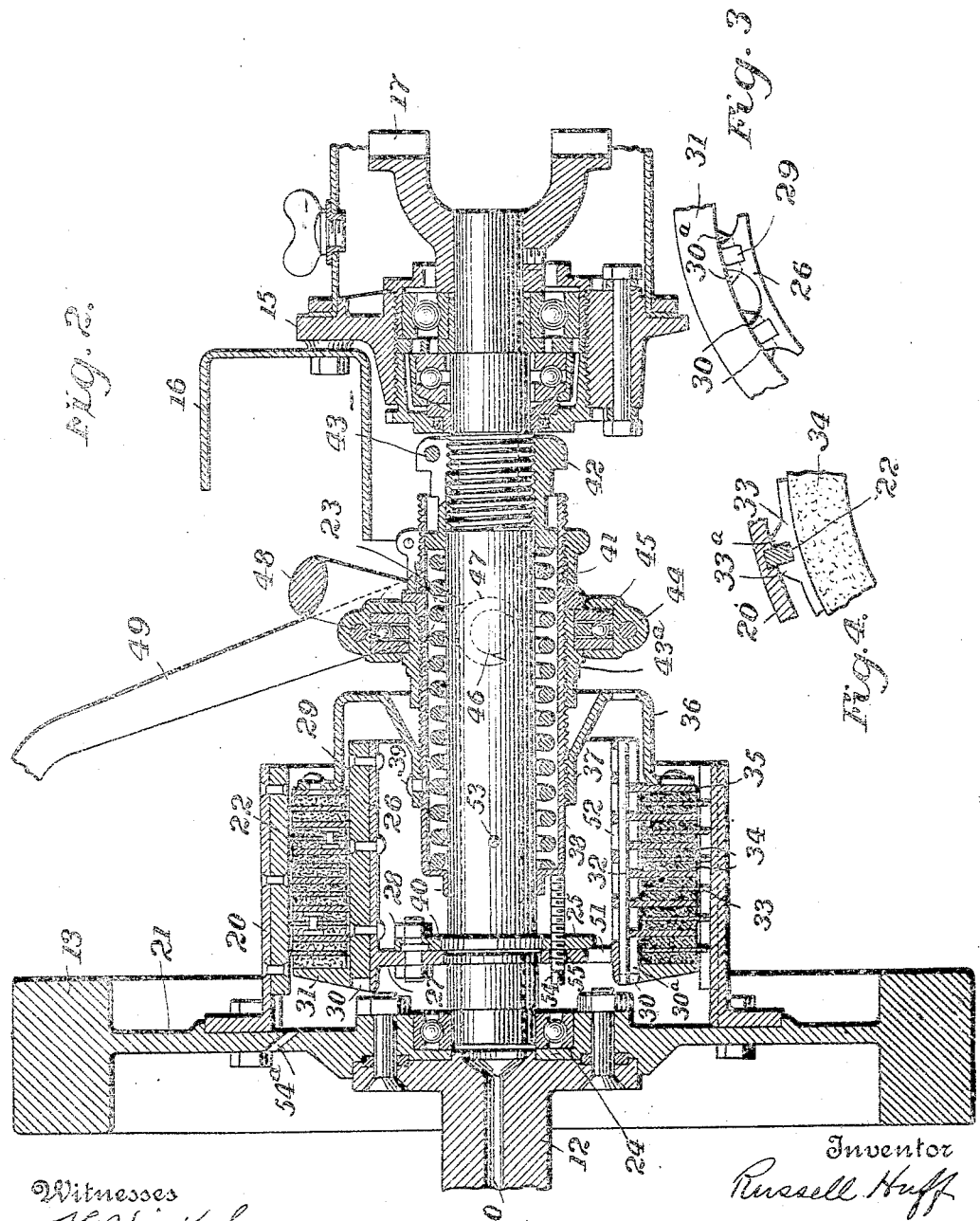

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

CLUTCH MECHANISM.

1,122,119.　　　　Specification of Letters Patent.　　Patented Dec. 22, 1914.

Application filed April 18, 1910. Serial No. 556,251.

*To all whom it may concern:*

Be it known that I, RUSSELL HUFF, a citizen of the United States, and resident of Detroit, county of Wayne, State of Michigan, have invented certain new and useful Improvements in Clutch Mechanisms, of which the following is a specification.

This invention relates to clutch mechanisms, and particularly to clutch mechanisms which are arranged to be used in connection with motor vehicles.

One of the objects of this invention is to provide a clutch mechanism which may be easily assembled and disassembled.

Another object is to construct a clutch mechanism which will be light in weight and possess the required strength.

Another object is to provide a clutch mechanism which may be readily lubricated.

Further objects will appear from the detailed description.

The invention will be described in connection with the accompanying drawings, in which—

Figure 1 is an elevation partly in section of a hydrocarbon engine and its fly wheel, a propeller shaft, and a clutch mechanism connecting the hydrocarbon engine to the propeller shaft; Fig. 2 is a longitudinal section of the clutch mechanism; and Figs. 3 and 4 are detail views.

Referring to the drawings, 10 designates the motor which may be of the hydrocarbon type, provided with a crank case 11, and 12 designates the crank shaft. The cranks dip into an oil well formed in the crank case, so that the motor will be lubricated by the splash system. A fly wheel 13 is mounted upon the crank shaft and has connected to it a clutch mechanism 14. The clutch shaft is supported in a bracket 15, which is bolted to a cross member 16 of a motor vehicle, and a universal joint 17 is arranged to connect the clutch shaft with a propeller shaft 18. A cylindrical member 20 is bolted to the web 21 of the fly wheel and has riveted to its inside walls a series of longitudinally extending keys 22. The clutch shaft 23 is journaled at one end in the bracket 15 by means of suitable ball bearings, and at its other end in a roller bearing cage 24 which is mounted in the fly wheel which forms an extension of the crank shaft.

A spider 26 cylindrical in form, has integral with it a web 27, which is arranged to be bolted to a flange 25 integral with the clutch shaft, by means of a circle of bolts 28. This spider has riveted to it, a series of longitudinally extending keys 29 similar to the keys 22, and has formed integral with it a series of lugs 30. An end ring or plate 31 is arranged to be mounted upon the spider 26, and is provided with lugs 30ª which engage the lugs 30, as shown in Fig. 3. A series of clutch elements comprising steel plates 32 are mounted upon the spider and provided with key ways or lugs similar to the lugs 30ª which engage the keys 29. A second series of clutch elements comprising plates 33, Fig. 4, are provided with key ways or lugs 33ª engaging the keys 22 upon the cylindrical member 20. These plates are faced with material 34 like asbestos, the asbestos being riveted to the plates as shown in Fig. 2.

The end plate 35 has secured to it a cylindrical clamping member 36 which is provided with an inwardly extending portion 37, having a screw threaded engagement with a sleeve 38 so as to permit adjustment. If the proper adjustment has been made, the parts are firmly secured together by a suitable fastener 39. The sleeve 38 is provided with a reduced portion 40, which engages the clutch shaft and the annular portion at the end of the sleeve, forms an abutment for a spring 41. A second abutment 42 is mounted on the clutch shaft and has a threaded engagement therewith, so as to be adjustable longitudinally thereon, for the purpose of adjusting the tension of the spring 41. The abutment 42 is arranged to be locked in position by a bolt 43.

Suitable means are provided for shifting the sleeve 38 longitudinally of the clutch shaft. For this purpose, a support 43ª is adjustably mounted on the sleeve and is arranged to be locked in adjusted position. A shifter ring 44 is connected to the support by means of an antifriction bearing 45, and is provided with trunnions 46, which are engaged by forks 47 of a shifter member 48, which is pivoted on the cross member 16. The shifter member 48 is arranged to be actuated by a suitable lever 49 which may be engaged by the operator's foot.

The operation of the clutch so far described, will be obvious. Normally the spring 41 throws the clutch elements into frictional engagement, so that the driving shaft will be clutched with the clutch shaft. By operating the lever 49, the sleeve 38 with its attached member 36 is moved rearwardly so as to disengage the clutch elements. The clutch, described, is, what is known as the dry disk clutch as distinguished from a clutch, the elements of which run in oil. It is, however, desirable to lubricate the clutch elements, and more especially the bearing surfaces between the keys and the clutch disks. The crank shaft 12 is provided with a channel 50 which communicates with the interior of the crank case. During the operation of the engine, the oil in the crank case will be churned up and some of it will enter the passage 50. This oil will flow toward the clutch shaft and will pass through the roller bearing cage 24, and lubricate the same. The oil passing the roller bearing will be discharged into the clutch casing and some of it will be thrown out by centrifugal force on the keys 22, so as to lubricate the same. The web 27 and the cylindrical part of the spider between the keys are provided with numerous holes 51, 52 respectively, so that some of the oil will find its way into the interior of the spider and passing through holes 52 will lubricate the keys 29. The surplus oil from the clutch casing will be discharged through apertures 54 formed in the fly wheel web. The clutch shaft is bored practically throughout its length as shown and is provided with holes 58, so that the bearing between the clutch shaft, the spring, and the extension 40 will be thoroughly lubricated. It will be understood that the amount of oil required and supplied through the channel 50 is relatively small being only that required to lubricate the sliding parts of the clutch.

By means of the above construction, the clutch can be readily disassembled by disconnecting the clutch shaft from the propeller shaft, unbolting the clutch bracket from the cross bar 16, and disconnecting the ring 44 from the shifter 48; the clutch shaft and the parts mounted thereon can then be removed as a unit from the cylindrical member 20 by an axial movement. The cylinder member 20 can also be easily disconnected from the fly wheel web by loosening the bolts.

In order to disassemble the clutch elements, the following means are provided: Two or more threaded screws 54 have a threaded engagement with the flange 25, and are arranged to bear against the end of the sleeve 38. After the clutch shaft and its attached parts are withdrawn from the cylindrical member 20, screws 54 can be adjusted so as to move the sleeve axially of the shaft, and so compress spring 41 as to relieve the clutch elements of the tension of the spring. The screws pass through enlarged holes 55 in the web 21, which permit the heads to pass therethrough. After the clutch elements have been relieved of the tension of the spring, the spider 26 can be unbolted from the flange 25 and removed with the clutch elements from the clutch shaft, thereby permitting the removal and replacement of clutch elements.

It is obvious that various changes may be made in the details of construction without departing from this invention, and it is, therefore, to be understood that this invention is not to be limited to the specific construction shown and described.

Having thus described the invention, what is claimed is:

1. The combination with a motor having a crank shaft and a crank case, of a driven shaft, and a clutch connecting said shafts, said crank shaft being provided with a channel extending from said crank case to said clutch to lubricate the latter.

2. The combination with a motor having a crank shaft and a crank case, of a driven shaft, a clutch connecting said shafts, and a casing for said clutch, said crank shaft being provided with a channel leading from said crank case to said clutch casing to supply lubricant to said clutch.

3. The combination with a motor having a crank shaft and a crank case, of a driven shaft, a bearing between said shafts, and a clutch connecting said shafts, said crank shaft being provided with a channel extending from said crank case to said bearing so as to lubricate the same.

4. The combination with a motor having a crank shaft and a crank case, and a roller bearing on said crank shaft, of a driven shaft journaled in said bearing, and a clutch connecting said shafts, said crank shaft being provided with a channel extending from said crank case to said bearing to lubricate the same.

5. The combination with a motor having a crank shaft and a crank case, of a driven shaft, a bearing between said shafts, a clutch connecting said shafts, said crank shaft being provided with a channel extending from said crank case to said bearing so as to lubricate the same, and means permitting the lubricant from said channel to lubricate the clutch.

6. The combination with a motor having a crank shaft and a crank case, of a driven shaft, a clutch connecting said shafts, a casing for said clutch including a movable part, and means for supplying lubricant from said crank case to said clutch casing, the lubricant being thrown in engagement with the clutch parts by centrifugal force.

7. The combination with a motor having a crank shaft and a crank case, of a driven shaft, a clutch connecting said shafts, said clutch including movable friction disks and keys therefor, a casing for said clutch including a movable part, and means for supplying lubricant from said crank case to said clutch casing, the lubricant being thrown in engagement with said disks and keys by centrifugal force.

8. The combination with a motor having a crank shaft and a crank case, of a clutch casing mounted on the end of the crank shaft, a clutch within said casing having keys and relatively sliding clutch plates, and means for conveying lubricant by the splash system from said crank case to said keys for lubricating the latter.

9. The combination with a motor having a crank shaft and a crank case, of a driven shaft, a clutch connecting said shafts, and a spring on said driven shaft for actuating said clutch, said shafts being provided with channels for supplying said spring with lubricant from said crank case.

10. In a clutch, the combination with driving and driven shafts, of clutch disks connecting said shafts, a sleeve on said driven shaft, an end plate mounted on said sleeve, and a spring on said driven shaft and surrounded by said sleeve.

11. In a clutch, the combination with driving and driven shafts, of clutch disks connecting said shafts, a sleeve on said driven shaft, an end plate mounted on said sleeve, a spring on said driven shaft, and an adjustable sleeve on said shaft telescoping with said first sleeve.

12. In a clutch, the combination with driving and driven shafts, of clutch members on said shafts, a spring for throwing said members into engagement, means for throwing said clutch members out of engagement, and means for compressing said spring and relieving the clutch members of the tension of said spring.

13. In a clutch, the combination with driving and driven shafts, of clutch members on said shafts, a spring for throwing said members into engagement, means for throwing said clutch members out of engagement, an abutment for said spring, and means engaging said abutment so as to relieve the clutch members of the tension of said spring.

14. In a clutch, the combination with driving and driven shafts, of clutch members on said shafts, a spring for throwing said members into engagement, means for throwing said clutch members out of engagement, and adjusting means on said driven shaft constructed to compress said spring and relieve the clutch members of the tension of the spring.

15. In a clutch, the combination with driving and driven shafts, of clutch members on said shafts including clutch disks, end members for said clutch disks, a spring for moving said end members together so as to engage the clutch, means for separating said end members so as to disengage the clutch, and means for relieving the clutch members of the tension of said spring without relieving the tension in the spring.

16. In a clutch, the combination with driving and driven shafts, of clutch members on said shafts including clutch disks, end members for said clutch disks, a spring for moving said end members together so as to engage the cluth, means for separating said end members so as to disengage the clutch, and adjusting means on said driven shaft for relieving the clutch members of the tension of said spring without relieving the tension in the spring.

17. In a clutch, the combination with driving and driven shafts, of clutch members on said shafts including clutch disks, end members for said clutch disks, a spring for moving said end members together so as to engage the clutch, means for separating said end members so as to disengage the clutch, means for relieving the clutch members of the tension of said spring without relieving the tension in the spring, and means whereby one of said end members may be removed.

18. In a clutch, the combination with a clutch shaft having a clutch spider removably secured thereto, of an end plate arranged on said spider and secured against forward endwise movement, a clutch casing surrounding the spider, clutch plates keyed alternately to the spider and the casing, a clamping member for pressing the plates into frictional engagement, a spring for operating the clamping member, a lever for compressing the spring to open the clutch, and means comprising a threaded element for compressing and holding the clutch spring whereby the spider may be disconnected from the clutch shaft for the purpose of removing the clutch plates.

19. The combination with a motor crank shaft and a clutch casing secured thereto, of a clutch shaft arranged in line with the motor shaft and having a bearing in the end thereof, a clutch spider secured to the clutch shaft, clutch plates arranged alternately on the clutch casing and spider, and arranged to coöperate frictionally, a clamping member engaging the outside spider plate, a sleeve secured to said clamping member and surrounding the clutch shaft and having a shoulder at one end thereof, an adjustable abutment on said clutch shaft, a spring arranged between said shoulder and said abutment and within said sleeve and adapted to close the clutch, and means for relieving the clutch of the tension of the spring.

20. The combination with driving and driven shafts, of a clutch connecting said shafts, a propeller shaft, a detachable connection between said driven and propeller shafts, means detachably securing said clutch to said driving shaft, and a detachable support for said driven shaft, whereby said clutch and driven shaft may be removed as a unit.

21. The combination with driving and driven shafts, of a clutch connecting said shafts, a propeller shaft, a detachable connection between said driven and propeller shafts, said clutch including clutch members secured to said driving and driven shafts respectively, clutch elements between said members, said clutch elements having detachable connections with the clutch member on the driving shaft, and a detachable support for said driven shaft, whereby said driven shaft and said clutch elements may be removed as a unit.

22. The combination with driving and driven shafts, of a clutch connecting said shafts, a propeller shaft, a detachable connection between said driven and propeller shafts, said clutch including a cylindrical member secured to said driving shaft, a spider secured to said driven shaft, and clutch elements on said spider and detachably connected to said cylindrical member, and a detachable support for said driven shaft, whereby said driven shaft, spider, and clutch elements may be removed as a unit.

23. The combination with driving and driven shafts, of a clutch connecting said shafts, a propeller shaft, a detachable connection between said driven and propeller shafts, means detachably securing said clutch to said driving member, a detachable support for said driven shaft, whereby said clutch and driving shaft may be removed as a unit, said clutch including clutch elements and a spring for clutching said elements, and means for relieving the tension of said spring to permit disassembling of said elements.

24. The combination with a motor having a crank shaft, of a driven shaft, and a clutch connecting said shafts, said crank shaft being provided with a channel adapted to supply lubricant to the clutch.

25. The combination with a motor having a crank shaft, of a driven shaft, a bearing between said shafts, and a clutch connecting said shafts, said crank shaft being provided with a channel adapted to supply lubricant to said bearing.

In testimony whereof I affix my signature in presence of two witnesses.

RUSSELL HUFF.

Witnesses:
E. H. KING,
P. J. KILCLINE.